United States Patent
Sun

(10) Patent No.: US 7,644,138 B2
(45) Date of Patent: *Jan. 5, 2010

(54) FORENSICS TOOL FOR EXAMINATION AND RECOVERY AND COMPUTER DATA

(76) Inventor: David Sun, 8825 Hunting Lodge Ct., Vienna, VA (US) 22182

( * ) Notice: Subject to any disclaimer, the term of this patent is extended or adjusted under 35 U.S.C. 154(b) by 464 days.

This patent is subject to a terminal disclaimer.

(21) Appl. No.: 11/294,560

(22) Filed: Dec. 6, 2005

(65) Prior Publication Data

US 2007/0226170 A1    Sep. 27, 2007

(51) Int. Cl.
*G06F 15/16* (2006.01)
(52) U.S. Cl. .................................................. 709/219
(58) Field of Classification Search ................. 709/219
See application file for complete search history.

(56) References Cited

U.S. PATENT DOCUMENTS

| | | |
|---|---|---|
| 6,792,545 B2 | 9/2004 | McCreight et al. |
| 2002/0152397 A1 | 10/2002 | McKay et al. |
| 2003/0236993 A1 * | 12/2003 | McCreight et al. .......... 713/200 |
| 2004/0006588 A1 | 1/2004 | Jessen |
| 2004/0203686 A1 * | 10/2004 | Bahr ........................... 455/418 |
| 2004/0260733 A1 | 12/2004 | Adelstein et al. |
| 2005/0027750 A1 | 2/2005 | Martin et al. |
| 2005/0055309 A1 * | 3/2005 | Williams et al. .............. 705/40 |
| 2005/0097366 A1 | 5/2005 | McCreight et al. |
| 2006/0064761 A1 * | 3/2006 | Multerer et al. ............... 726/27 |
| 2006/0191016 A1 * | 8/2006 | Ostergren et al. ............. 726/27 |
| 2007/0085710 A1 * | 4/2007 | Bousquet et al. .............. 341/50 |

* cited by examiner

*Primary Examiner*—Benjamin R Bruckart
(74) *Attorney, Agent, or Firm*—John J. Yim

(57) ABSTRACT

The present invention is directed to an electronic forensic method for electronic discovery and computer forensics. The invention allows a user to conduct limited preliminary examination of computers using a client program on a physical memory device, whereby limited information about the examination result is displayed. To further access and examine the actual underlying data, the user must obtain additional functionality by obtaining a command block from a control server. The additional functionality will allow the client program to extract, copy, export, or further access the data of interest.

24 Claims, No Drawings

FORENSICS TOOL FOR EXAMINATION AND RECOVERY AND COMPUTER DATA

CROSS REFERENCE TO RELATED APPLICATION

This patent application is related to a concurrently filed utility patent application entitled "Forensic Tool for Examination and Recovery of Computer Data" filed on Dec. 6, 2005, and assigned Ser. No. 11/294,562 by publication number 20070168455. The concurrently filed application is incorporated herein by reference.

BACKGROUND OF INVENTION

Computer forensics is becoming an indispensable tool for information gathering as our lives become more dependent on computers and other digital technologies. As a result of this pervasiveness, electronic forensics increasingly plays a larger role in various investigative disciplines, such as in civil litigation and crime detection.

Conventional computer usage invariably leaves traces and evidence of use. Although a user may believe that specific data has been deleted or protected, investigators skilled in the art of digital forensics often can retrieve some or all of the deleted data. For example, "deleting" a file in a conventional manner normally only removes a file's entry from the drive index, which serves as the table of contents for the drive. The underlying data is not erased until it is overwritten through an independent process. Thus, although a file may appear to be deleted, it may be discoverable by one skilled in the art. Furthermore, computer usage generally leaves data scattered throughout the device undetectable to an average user. Similar to deleted or partially deleted files, one skilled in the art can locate these often critical pieces of data. Due to inherent properties of computer-produced digital data, one skilled in the art can often glean and use information using forensic methods.

Digital data has inherent key differences as compared to traditional paper data. Because electronic data is easily created, duplicated and manipulated, there is generally a greater amount of computer data than paper data. Digital data can be far easier to organize, search and cull. As a result of the ease of creation, manipulation, duplication, and storage of digital media, many of the documents and files created today are stored only in computers. Computer data also contains unique electronic information not present in paper documents. Such information about the information, or "metadata", can include user information, transmission and edit data, and various time stamps. Computer data is also electronically searchable and sortable by both the actual file contents and its metadata. A user can specifically target and manage relevant information through keyword searching, filtering, data culling, indexing and de-duping.

For example, in criminal and civil investigations electronic forensic discovery is gaining widespread use and acceptance. Police agencies and prosecutors often seek computer evidence of criminal conduct. Individual computer owners are also increasingly monitoring usage. Companies are also investigating employee misconduct, wrongdoing and fraud through computer forensics. When suspicious activity is identified, many companies conduct an internal investigation before bringing in legal assistance or law enforcement agencies. Even for non-investigative purposes, companies routinely monitor computer usage.

Because of the complexity of the tools involved and knowledge required for conducting computer forensics, non-experts such as attorneys, prosecutors and internal investigators often turn to a computer forensic expert to conduct electronic discovery. Although there is no substitute for a well-qualified expert, there is a need in the art for a tool that will enable a non-expert to conduct electronic discovery.

Normally, simply searching for files in a computer via accessing its contents through native operating system controls may alter the evidence and bring the validity of the results into question. Simply booting up a computer device or engaging the operating system of a live computer often alters the data on the digital media. Thus, spoliation concerns require that proper precautions be taken during electronic discovery, and forensically sound procedures must be used to show that the recovered evidence is valid and reliable. As in traditional forensic disciplines, detailed, documented, and art-accepted protocols must be employed. Safeguards may include simply comparing the size and creation dates of files to more advanced techniques such as conducting cyclical redundancy checks and calculating a message digest. Additional forensic steps may include detailing and logging the steps of recovery process and verifying the accuracy of the copied data.

Authentication and chain of custody are also important considerations. In order for the gathered evidence to be useful in court, it is important that the data not be damaged or compromised. Without verifiable safeguards, admissibility and reliability of the gathered evidence may be challenged and excluded. Also, to avoid raising suspicion, for example in an on-going investigation, it may be desirable to avoid leaving traces of forensic activity on the target device. Because of these concerns, forensic experts are often used.

The present invention addresses these concerns by allowing a user (a non-forensic expert) to conduct electronic discovery in a forensically sound manner and by allowing the user to employ an integrated mechanism to export data for analysis by a forensic expert should one be necessary. Among other safeguards as discussed, the present invention preferably automatically logs detailed information about the target computer and the examination. The log file is preferably encrypted, digitally signed, and stored for future validation.

Thus, the present invention allows a user to conduct a preliminary examination of a target machine in a forensically sound manner before making a decision about incurring the cost of retaining a forensics expert. In many situations, the present invention allows a non-expert to conduct a forensically sound electronic discovery without expert assistance.

SUMMARY OF INVENTION

The present invention concerns a tool for conducting electronic discovery and computer forensic analysis. By merely loading software (a client software or program) into the memory of a target device, the user is able to determine if a target device likely contains files or other data of interest. The client component of the present invention is preferably a self contained CD with an operating system kernel that recognizes associated hardware and software and allows for retrieval of forensic data. The software may be distributed through various channels as known in the art.

Using the client software, a user boots a target device, in one embodiment a computer, and examines the electronic contents in a forensically sound manner. The client program will enable the user to conduct limited examination of available data. This is facilitated through the use of a simple, streamlined, intuitive graphical user interface (GUI). In one embodiment, the GUI may consist of a task-oriented process flow, which guides the user through various steps in conducting a forensic examination.

As part of the examination, keyword searches and pre-defined or custom filters will assist the non-expert in determining whether a given digital medium, possibly a drive, in the computer contains data of interest. Data displayed to the user at this point, however, will generally be statistical. Generally, the file's existence and numbers of keyword hits are displayed. Additional information, such as file name, date stamps, time of modification, and file size, may also be displayed.

By repeating the searches and filters, the user may repeatedly examine a particular drive of a target computer. The user may also use the client software repeatedly on multiple drives and on different computers.

Once the user determines that a computer contains data of interest and wishes to obtain the data in a forensically sound manner for further analysis the user may obtain a command block. The command block directs the client program to perform specific directives or functionalities, such as conducting specific searches and retrieving desired data from a target computer to an external storage device for further analysis. The user must access a control server website, preferably from a computer different than the target computer, to purchase a command block. The control server will preferably offer different types of command blocks with different features and categories.

Once the user obtains, i.e., purchases, a command block, it is preferably transferred using an external memory device, such as a USB memory device, to the target computer. The external storage device may also function as a destination drive for downloading information of interest from the target computer.

Preferably, each command block is customized for use only with a specific drive on a specific computer. Moreover, each command block is customized for use with the specific drive before any alteration is made to the drive either physically or logically. Thus, the command block may be configured to operate only on a specifically unique drive. This may be accomplished by using a drive key, which is calculated and provided by the client program to serve as a unique identifier of each hard drive. Should a user access the computer without forensic safeguards and thereby modify the drive, the command block will no longer work on the specific drive.

As an alternative to obtaining command blocks, once a user determines that a computer contains data of interest, they may wish to forensically copy the entire contents of the computer for analysis by a forensic expert. Using the client software, the user may create a forensically sound copy of any storage devices and export the copy to an external storage device. This copy will be encrypted and digitally signed, and along with a log of the activity, can be validated at a later time. Once exported, the external storage device can be physically delivered to a third party expert for analysis.

The present invention also allows a user to conduct electronic discovery in a forensically sound manner. Examining and recovering data in a target computer does not alter the electronic evidence on the target computer. The client program operates the target computer in a read-only mode to prevent modification of underlying data. The client software and its data are stored only in the random access memory, thus preventing the creation of any new data or modification of the underlying data of the drive or device under examination.

The client program also documents the examination process for future authentication by automatically generating logs. As part of the examination process for example, the client program recognizes and logs the system configuration of the target machine, including information about connected drives.

All relevant actions and diagnostics are logged. After identifying data of interest on a drive, for example, the transfer of evidence to an external drive is also logged. To make the log tamper proof, it is digitally encrypted and signed before being stored on the external drive. Digital encryption and signatures ensure that the data retains its integrity and that it is decrypted only by the intended recipient. This allows third party authentication of the log data at a later time.

The present invention also concerns a method for allowing a user to examine a target computer as described using client software and a command server for providing, i.e. selling, customizable command blocks. The user is able to reuse the client program to repeatedly make preliminary examinations of drives of interest without incurring additional cost and without needing additional functionalities as enabled through a command block. As discussed, the client program may be used repeatedly on one or more drives and on one or more computers. Thus, the client program allows a user to repeatedly determine whether various drives contain information of interest. Each time a determination is made, however, the user will need to visit a vendor center to obtain a command block to retrieve the desired underlying information.

The command block is an execution command code that allows and directs the client program to retrieve specific data from a specific hard drive of the target computer to an external drive (such as a USB drive) for detailed analysis. The command block contains a drive key, provided by the customer at time of creation, which uniquely identifies a drive. Thus, each command block is preferably executable only on a specific drive matching the drive key calculated by the client program. Furthermore, once it has been obtained, the command block can preferably only be executed on a drive before it is changed either logically or physically. Once the target computer is used without the appropriate forensic safeguards and the underlying drive is altered, the command block will no longer be usable on the altered drive.

The present invention also contemplates a method of distributing client software, which can be used repeatedly to carry out a specific set of functions without incurring additional costs. The present invention, however, also contemplates making available additional functionalities that may be purchased at additional cost. As an embodiment, the client software is electronic forensic software that allows a user to make preliminary examinations of target computers and drives repeatedly using a single client software program. To further realize the capabilities of the client software, however, the user must contact the vendor and purchase additional features or commands.

Furthermore, such additional functionalities, features or commands are customizable by the user. For example, a user visiting the vendor site will be able to specify and customize the exact types of functionalities to be purchased. In one example, a person investigating a target computer using forensic client software will be able to visit the control server to purchase a command block and specifically tailor the exact type of data that is to be retrieved and downloaded onto an external drive.

Once the user purchases a customizable feature or command, however, the feature or command is limited for use only to a specific target. In one embodiment, the feature or command is specific to a device, such as a computer. Thus, once the customizable feature or command is purchased, it is usable with the client program only on a specific computer. Optionally, the feature or command is usable only with a specific hardware device within a computer. Furthermore, the feature or command is specific to a specific hardware in a specific state. For example, using the example of forensic software and the command block, the command block is executable only with a given specific computer, with a only given specific hard drive in said given specific computer, and only in a specified state of the specific hard drive. Once the drive is either logically or physically altered through use, the purchased command or feature may no longer work on the altered drive.

Thus, the present invention comprises reusable client software, which can repeatedly execute limited functionalities on various devices. The present invention further comprises additional device-specific, component-specific (i.e., drive-specific), and state-specific functionalities that may be separately purchased for execution by the client software only on a specified component, in a specified device, and in a specific state prior to alteration logically or physically.

This device-specific, component-specific, and state-specific functionality may be applied in various contexts outside computer forensics. For example, a song, a movie, an execution command, anti-virus software, an operating system patch, and other functionalities, can be delivered to a target drive on a target device for execution or operation for execution by the client software before the device is altered logically or physically. Financial applications, Internet commerce applications, software applications, and various other applications are contemplated by the present invention.

In computer forensics applications, the present invention also concerns additional applications, wherein users and forensic investigative companies employ the present invention to compliment existing capabilities. By tracking software version data as part of the drive key, partnerships may be formed to incorporate customized versions of the present invention into existing product or service offerings with revenue sharing agreements. For example, some companies specialize in storing discovered evidence but do not recover the evidence themselves. The present invention allows such storage companies to add forensic recovery services to their capability with a trackable, custom version of the invention. Technology and consulting companies may incorporate the present invention into other existing services and technologies.

Command blocks may also be sold using different pricing models. For example, rates may be pre-negotiated for specific clients, and commissions may be integrated into the sale price for intermediary vendors. Volume discounts may also apply. For example, for resellers that exceed a predetermined dollar amount in sales may qualify for discounts.

Some of the preferred embodiments of the present invention are discussed below. As the present invention may be embodied in several forms without departing from the spirit or essential characteristics thereof, it should be understood that the description contained herein is not limited by the details of the foregoing description, unless otherwise stated. The present invention should be construed within its spirit and scope, and therefore all changes and modifications that fall within the meets and bounds of the claims, or equivalences of such meets and bounds are therefore intended to be embraced by the invention.

DETAILED DESCRIPTION

The present invention generally comprises a client component and a control server component. The client component comprises a digital memory storage device, which further comprises client software for booting and examining the target computer. The control server component is the business center that provides command blocks, which enable the software component to download selected data from a target computer.

Example of Use in Electronic Discovery Mode

A digital memory storage device, such as a CD containing the client software, is inserted or loaded into a target computer being analyzed. The client software may be stored in a CD or any other suitable medium as known in the art. For example, the software may also be downloadable onto a USB memory device through the Internet. In the present example, a CD is used. The user is able to use the client software repeatedly as desired to examine different drives and different computers. The client software may be used repeatedly on a single computer drive. The client software may also be used on different computer drives. The client software may further be used on different computers as desired.

The user inserts the CD into a target computer and boots the target computer off of the CD. The client software of the present invention starts up from the CD. This client software may be displayed using simple, streamlined, intuitive graphical user interfaces (GUI). In one embodiment, the GUI may consist of a task oriented process flow which guides the non-expert through the necessary steps to conduct a forensic examination. The non-expert would be guided through advanced concepts and critical decisions encountered during the process by context specific tutorials and documentation provided within the client GUI.

Once fully initialized, the client software will preferably automatically recognize various hardware platforms and software configurations and allow for rapid examination of forensic information. Available drives of the target machine are preferably recognized and documented. The software preferably automatically displays a menu containing the drives, partitions or segments of available drives.

Once a device or drive is selected for analysis, a digital fingerprint is preferably calculated for the relevant device or drive. Using a hashing algorithm such as MD-5, SHA-1 or SHA-256, a simple modification-detection scheme is implemented. This digital fingerprint is kept for later use to identify if the selected device or drive was modified during the analysis.

Next, a user may specify search parameters for analyzing a selected drive. Once the client software analyzes and searches the drive, the user is provided a list of all data on the drive matching the query.

For example, the software could display the information available about the files in the table of contents (TOC) for the drive, occasionally referred to as the File Allocation Table (FAT). Various filters and analysis of the TOC are allowed to facilitate understanding of the drive contents. Different types of information may be displayed. For example, deleted files may be included with the initial display. Various file data may also be included. Examples include directory location, file name, last modified, file size, and time stamps. Information such as FAT details and statistics for data outside the FAT may also be displayed at no charge using the client software. Optionally, filtered selections of files can be de-duped to ensure the same file is not analyzed twice. The displayed menu, or TOC, may be manipulated to facilitate understanding of its contents. The client program of the present invention is capable of analyzing NTFS, FAT(12/16/32), other common Unix/Linux file system types, and other systems types as known in the art.

Furthermore, predefined and customized sorts and reports can be built and executed to allow for even more functionality. In one embodiment, predefined filters which can be activated at the click of a button in the GUI, could allow users to see TOC entries specific to their investigation. Examples of these filters include the display of: only deleted files, only image and video files, only word processing documents, only e-mail files, only web surfing related files, and only archive files.

In addition to reviewing TOC entries, keyword searches may be used to provide the number of instances that a word or phrase appears on the drive. Counts of encrypted, password protected files may also be determined. Unallocated and slack space may also be analyzed for files and fragments that may be of interest. Previously deleted files may be recovered from unallocated space using file signature matching techniques. A message digest maybe calculated for all files on the device and compared to a database of known files to include/preclude them for/from further investigation. Thus, through the various filters and searches provided, a user is able to identify a set of relevant documents or data fragments.

The actual data, however, is not viewable at this time. Only limited information about the data of interest is revealed. These features of the client software provide an easy tool for determining whether data of interest resides on the target computer. Should the user elect to examine the actual data, a copy of the underlying searched data must be extracted from the target machine either in part or in its entirety. This can be accomplished by obtaining a command block from a control server or by exporting the entire contents of the drive for analysis by a third party vendor.

A control server is generally a server that sells or otherwise provides command blocks. Without a command block, the user will not be able to use the client software to extract the actual data from the target computer. The control server may also contain various other features as known in the art for a server, including an Internet website for selling command blocks with a help center, product information and descriptions, payment processing, contact information, disclaimers, and terms of use. Other methods of obtaining command blocks, from a control server such as by using a telephone, standard shipping or electronic mail, are also contemplated by the present invention.

A user will preferably access the control server through an online computer that is different from the target computer. Using the server, a user is able to create and/or purchase command blocks. A user will thus be able to construct, pay and obtain command blocks from the control server in an automated fashion. Once obtained, the command blocks are transferred to an external storage device, such as a USB drive. A USB drive may be connected to the online computer to facilitate this process.

Command blocks may be priced according to various factors such as the type and size of information involved. Factors may include, among others, size of drives analyzed, whether visible files, deleted files, FAT data, unallocated space or slack space are included, and whether recovery of lost partitions, keyword searches, web page fragment analysis, recovering Internet surfing history through parsing of history files, and de-duping recovered data are also enabled. For example, exporting of visible and deleted files based on the FAT data may be priced differently from more complicated functions such as extraction of files from unallocated and slack space. Extraction of data based on keyword searches may incur an additional fee. Command block prices may also depend on drive size. Other functions such as parsing of Internet surfing history files and de-duping of recovered data may also incur additional charges.

Command blocks may also be sold for specific types of analysis at a set rate. For example, a "pornography investigation" command block would extract all images, movies and related web surfing activity involving pornographic material. The present invention also contemplates pricing structures based on pre-purchased bundles or packages or on client status, such as the client being classified as a frequent user.

The command block stored on an external memory device (i.e., a USB drive) is accessed by the target computer, wherein the software recognizes and authenticates the command block and allows the data of interest to be downloaded onto the external memory device without possibility of modifying other devices or drives in the target computer. The desired data may be analyzed with a modification-detection scheme possibly involving MD-5, SHA-1 or SHA-256 hashing to protect the integrity of the data on the external drive.

Once extracted, drive contents can be viewed by the user. With the extracted data, the user not only gets statistical data about the files but also the files in their native format. The user is now able to access and view the actual files themselves including any related meta-data. Thus, whereas the client program alone only displayed limited data about the documents or files, the command-block enhanced program allows the actual files and documents to be downloaded for further analysis.

In lieu of extracting specific data of interest, once a device is known to be of interest, a user may wish to forensically export the entire contents of the device for analysis by a forensic expert. Using the client software, the user may create a forensically sound copy of the storage devices and export the copy to an external storage device. The copy may be encrypted and analyzed with a modification-detection scheme possibly involving MD-5, SHA-1 or SHA-256 hashing (or other methods as known in the art) to protect the integrity of the data on the external drive while it is physically delivered to a third party expert for analysis.

Through the process, forensically sound techniques are employed to prevent spoliation of evidence. All actions and diagnostics are logged. The log file(s) is (are) encrypted, signed, and stored for future analysis. If data is exported in an encrypted format, an unencrypted index file is created describing the contents of the recovered data.

If at the end or any other point in the process the user desires further assistance or if a computer forensic expert is needed, the data of interest can be delivered to a vendor to provide custom analysis of the data. This can be performed by delivering the destination drive containing either data extracted by the use of command blocks or a forensic copy of the entire contents of the target device/drive obtained by using a special feature in the client software.

In a preferred embodiment, the client software provides a mechanism for forensically exporting the entire contents of the target device/drive to the destination drive. Because digital evidence can be duplicated accurately using forensic techniques, a copy of the entire contents can be made for analysis by a forensic expert. By first copying the original evidence, the original evidence may be further protected against accidental or unintentional damage or alternation. These contents can be digitally signed and encrypted to ensure that they are not modified in transit. Upon delivery to a computer forensic expert, the contents can be decrypted and verified prior to forensic analysis. Such an option may be available to the user at any point in the process.

Operating Environments

The present invention is preferably designed to operate with any known types of microprocessors and chip designs. At minimum, the target computer should preferably have hardware capabilities similar to those commonly available in the public. The present invention, however, may be designed to operate on computers with more exotic hardware as known in the art. Should a target computer not possess the minimum hardware requirements for a particular version of the present invention, the user will be informed of the limitations, and the present invention may operate in a reduced mode with limited functionality. Moreover, as technology progresses, the present invention may be operated on more advanced systems.

Client System Features

The client boots off the CD. The following is a description of one embodiment of the functional requirements of the client portion of the present invention. The present invention may be embodied in alternate forms without departing from the spirit of the present invention, and it should be understood that the description contained herein is not limited by the details of the foregoing description.

Generally, a user boots the target computer from a CD containing the client software. A logo for a product of the present invention may appear with a progress bar indicating boot progress. During the boot sequence, a user may elect to display the verbose boot mode for detailed boot information. Any errors encountered are also preferably logged, preferably automatically. The client system preferably supports Intel and AMD based computers. An operating system kernel and all required drivers will preferably be included in the CD.

Target system configuration is identified and documented. After booting, the client program will determine the configuration of the target computer and document the information. The client program will record such information in an event log. Recorded details may include for example, the system-cock time and date, hard drives and partitions, available RAM, CPU type and speed, input-output interfaces, and the software version of the present invention. Preferably, such details are logged automatically onto the events log.

The present invention contemplates using various interfaces and memory devices for transferring the command block from the control server to the target computer. Preferably a USB interface is used along with a USB memory device. Other suitable interfaces, however, may be used as known in the art. However if a suitable interface is not available, the user will be informed of the limitations, and the present invention may operate in a reduced mode with limited functionality such as a restriction to only viewing TOC and statistics.

Also, should the target computer system not possess minimum hardware requirements for a specific version of the present invention in use, the user may be informed that product capabilities may be limited. The user may then be prompted to contact the control server vendor for advanced services.

Client Software recognizes system drives and mounts them in read only mode. Once recognized, all drives that are not destination drives of the present invention will preferably be mounted in read only mode. Thus, other than for the destination drives of the client software, the drives of the target machine are not modifiable.

The client portion of the present invention will recognize all the available drives on the target computer. It will recognize devices, including but not limited to the following drives: parallel IDE drives; serial IDE drives; SCSI based drives (Narrow, UW, LVD, etc.); external USB/Flash drives; IOMEGA Zip and Jazz drives; CD/DVD, CD-R/RW, DVD-RIRW drives; and other known drive formats.

The client portion of the present invention will preferably provide for error handling for multiple drives. Preferably, a limitless number of physical drives and logical drives may be supported. The client software will also preferably detect Host Protected Areas (or any other device level mechanisms for obscuring data) on a drive and log their existence.

Destination drive is recognized after bootup. The client program of the present invention will recognize a destination drive to be used by the client program. As discussed, preferably an initialized USB (hard drive based or memory chip based) drive is used. Such drives may be distributed by a vendor pre-initialized or can be created from commercial off-the-shelf devices that have been modified as discussed. When such a destination drive is present, the user will receive acknowledgement, preferably automatically, of the existence of the initialized drive.

The client software presents a graphical user interfaces that lists drives available for Analysis. A graphical user interface will preferably provide the user drive information and the ability to select specific drives to analyze. Preferably without the user taking any action, the client program will display to the user all available drives indicating which drive, if any, may be selected for analysis.

The user then picks one or more drives to be analyzed. As discussed, in one embodiment, one or more drives may be selected for simultaneous analysis. In another embodiment, one drive is selected at a time for analysis. In the embodiment discussed herein, the user picks one drive for analysis.

As the user picks the drive to the analyzed, the client software preferably begins to analyze the FAT(s) of the drive selected, preferably displaying a progress bar. Next, the client program may display a table containing information about the selected physical drive. For example, a row may be displayed in the table for each physical drive detected. Information displayed in such tables may include, drive number, make and model, serial number of drive, size, numbers of logical partitions on physical drive, existence of write protect status, drive key, and existence of any obscured areas such as host protected areas and device configuration overlays.

A table of logical drives may also be displayed. Information in such tables may include individual drives, partition names and size, file system type, location on physical drive, write protect status, drive key, and presence of encryption.

Unless already performed, one of the first steps in analyzing a drive will preferably be to obtain a digital signature of the physical drive selected upon which the logical drive selected resides. As discussed, these digital signatures will be recognized by the command blocks or used by other aspects of the invention.

The file allocation tables (FAT) of drives and partitions are examined. Once a physical or logical drive is selected for analysis, the FAT(s) residing on the selected drive will be examined. The detailed results may be provided in a table format with navigation capabilities.

If a physical drive is selected for analysis, all partitions may be examined including any unallocated and lost partitions on the drive. Upon completion of drive examination, a graphical user interface may appear with a table displaying all of the contents on the drive FAT (TOC). The TOC will display the files in each drive/partition selected and may include the following information for files, creation date, last modified date, last accessed data, deletion date, file size, full path, name, and extension and other relevant information. Preferably, a "deleted" flag will indicate a deleted file, and an "exported" flag will indicate an exported file.

Preferably, the rows in the TOC may be sorted by each element. The program may also allow secondary and tertiary sorts and allows columns in the TOC to be hidden or unhidden. The ability to filter rows based on data values such as file extension, first letter of filename, date range, size range, deleted flag, exported flag and directory may also be supported.

Statistics on the data contents of the selected drive may be provided. Once a physical or logical drive is selected for analysis, the contents of the drive will preferably be examined in an abstract form. All portions of the drive will be examined including any unallocated or lost partitions on the drive and obscured disk areas. The results will be provided through statistics but no details will be provided.

At this point, keyword searching may be supported. Keywords can be searched using literal or regular expressions. The results of keyword searches may only provide a count of the number of occurrences of the keyword on the drive requested. In one embodiment, the client program allows only one keyword search in any given session. In other embodiments, multiple keyword searches can be conducted per session and/or per drive. Optionally, the ability to search for multiple keywords within a defined file or similar data structure may also be provided. In continuing to log the various activities, the results of the keyword search will preferably be displayed and saved to the event log.

Furthermore, identification of encrypted or password protected files will also preferably be supported. At this point, however, the results of encrypted or password protected search may only contain a count of the number of files that are encrypted or password protected. The locations of the files will not be stored or provided.

Additional statistics and information about the data may be displayed as known in the art. But the information displayed is limited so that the user must obtain one or more command blocks from the control server to be able to obtain and download the actual files or additional details. Alternatively, the user may export the entire contents of the drive using the client software for analysis by a third party expert.

Users may obtain command blocks from a control server. Preferably using a separate online computer, a user can purchase a command block from the control server. The command block is an instruction set that enables or allows the client program to search for and/or download data from the target computer onto its destination drive. The user navigates to a control server web site and configures a command block to be purchased.

Preferably, the control server recognizes an initialized USB drive attached to an online computer and downloads the desired command block to it. Once the command block is written to the drive, the destination drive is removed from the online computer and connected to the target machine where the client program can read and execute the command block.

Preferably, the client program will provide a drive key to the user for entering into the web site of the control server. Embedded in the drive key is information about the hard drive such as its signature, thus making the command block physically and logically hard drive specific. If information on the drive is changed, then the hard drive will change, and the command block will no longer work on the altered hard drive. Optionally, a command block may be configured to run repeatedly on a given hard drive.

User next executes the command block. Next, the user connects a USB drive with a valid command block to the target machine. Preferably, the present invention supports the hot swapping of USB drives. The client program will first scan the USB drive for command blocks. When the scan is completed, an interface may appear listing all command blocks residing on the USB drive and information about each command block, such as a specific description or indicating whether they have previously been executed.

After selecting a command block for execution, the client program authenticates the command block to verify that it is valid for the target computer and device. In addition, the client program may verify that there is enough space on the destination drive to store the results, warning the user if insufficient space exists. Again, the execution of the command block and its contents are logged.

During execution of the command block, all date and time stamp and path information for the extracted files should preferably remain unchanged. If this is not possible, the original time data should be documented via an index file which contains information about all the recovered data. This index file preferably lists the exported data for the executed command block and includes any available FAT related data for the files, date and time of the command block execution, and operator's name.

Fragments, files from unallocated space, and other data without path information will be written to the destination drive in an appropriate directory. If requested, fragments of data containing keyword matches may retain the context in which the keyword appears on the media. For example, in one embodiment, a user may specify that a number of bytes or ASCII characters on the device immediately before and after the keyword be extracted along with the keyword itself. This would assist the user in understanding the context in which the keyword appears on the media in subsequent reviews.

The presence of files that are archived, encrypted, password protected or any combination thereof on the target drive shall preferably be displayed. Examples of such files include but are not limited to ZIP files, Pretty Good Privacy (PGP) volumes, password-protected Microsoft Office documents and password-protected ZIP files.

In one embodiment, the searching of responsive documents and keywords within archive files may be supported. In another embodiment, the decryption and cracking of encoded or password protected files or archives may be provided to determine if responsive documents and keywords exist within these files or archives. While the command block is being executed, progress feedback may be displayed to the user. Additional feedback display options include: displaying recovered file names or paths during extraction; displaying a running or final count and breakdown of exported data. Any errors encountered may be displayed.

Furthermore, digital signatures will be created for all data retrieved. These signatures will also be logged in the event log for future reference. To maintain the integrity of the retrieved data, all retrieved data may be exported as read-only. Any data recovered using features that do not require payment will preferably be exported to the destination drive in an encrypted state. This data may be available for decryption pending payment.

A completion notification may be displayed when the data extraction process is completed. Preferably, the user may then physically remove the destination drive without any further action while still preserving the integrity of the data on the destination drive. The user may also be provided with a prompt to review the data.

Reviewing recovered data. Once the command block has been executed and data has been downloaded to the destination drive, the user will have the option to review the retrieved data in read-only mode. Although the downloaded data is preferably transferred to a different computer for viewing at this time, the present invention also contemplates an option of creating a data browser within the target computer without modifying the hard drive(s) of the target computer.

If a user selects the option to review recovered data on the target machine, a graphical user interface will appear to allow the user to easily navigate and review the data. The user may be able to review the exported data and files in their native format. Thus, if the files are Microsoft Word files for example, the user will be able to view them in a manner which recognizes and renders any text formatting that Microsoft Word would natively adhere. If the data consists of HTML data, a simple browser will render and display any available HTML data adhering the proper formatting. However if the file is not complete, the user will be able to view the data in text mode. Further, in text mode, the user may have the ability to suppress display of non-ASCII characters to increase the readability of the data.

Reviewing recovered data will not alter the file contents in any way. The user, however, may be able to tag or otherwise label or identify the reviewed data of interest for further review. As known in the art, multiple levels and types of tagging, noting, and cross-referencing may allow users to categorize and sort the information including techniques such as in Bates numbering.

Destination Drive Specification

The following is a description of an embodiment of the destination drive of the present invention. Other destination drives as known in the art may be used. The destination drive is preferably a USB connected storage device, capable of containing any command blocks and data retrieved from the target machine.

Physical device specification. In a preferred embodiment, the destination drive will comprise a storage device with a USB interface. The device will preferably support NTFS, FAT12/16/32, and Linux file systems, among others.

Device initialization. The destination drive initialization process will preferably be supported on Windows, Macintosh and/or Linux environments, or other applications as known in the art. Prior to drive initialization, the user may be warned that all data on the device will be deleted.

Upon connection to the target machine, the destination drive should preferably be recognized by the control server vendor without requiring a reboot or other interruption of the examination process. Subsequent analysis of the same drive should append to the logs on the destination drive or write new files using incremental file names. Additionally, warnings about overwriting the data on the destination drive should be provided.

Before exporting data to the destination drive, the user may be notified if available space in the destination drive is insufficient to store the amount of data to be exported. In the preferred embodiment, the user will be able to span the exported data across multiple destination drives thereby providing the ability to export a limitless amount of data.

Command Block Server Specification

A control server is a vendor site for selling command blocks. Preferably, the control server is an Internet, e-commerce website, providing graphical user interfaces for users to construct and purchase command blocks. The control server may also contain various other features as known in the art for a server, including an Internet website for selling command blocks with a help center, product information and descriptions, payment processing, contact information, disclaimers, and terms of use. In generating command blocks, the control server may ask for information, which may include drive key, operator name, partner identification, coupon codes, etc. Once the user chooses the options available as discussed in constructing the command block, the user is able to purchase and download the command block to the initialized drive. Other methods of obtaining command blocks, such as by using a telephone, standard shipping or electronic mail, are also contemplated by the present invention.

Some of the options for command blocks have been described above. They include, for example, features such as parsing through Internet surfing history files, whose output should be stored to a file on the destination drive in the same directory hierarchy as other restored data. Another option includes de-duping of files on the destination drive. All files that were de-duped shall be fully logged in a de-duping log/table which includes the path location of the master file and full path locations of all identical files that were deleted.

Event Logging

The output event log described herein is a forensically sound log as known in the art. The output log is preferably a forensically minded activity log. The log would contain, among other data: time and date stamps; various system information about the hard drives and partitions, memory, CPU, USB, versions; software version of the present invention; drive keys and external memory devices data; mounting times and types of digital devices; information regarding data that has been exported and their digital signatures; and command blocks run.

Command Block

As discussed, a command block is generated and configured by a user from the control server. The control server provides a convenient graphical user interfaces for defining search criteria. Once a command block has been specifically configured, defined, and purchased, the control server displays or exports the command block. The command block is then transferred to the client program running on the target computer. Once the command block is loaded onto the target computer, it is recognized by the client program. Preferably automatically, the command block will direct the client program to carry out specific features and commands as configured by the user.

A command block directs the client program to perform various types of forensic analysis. Searches not available with the client program alone may be conducted once a command block is introduced to the client program. The command block may also direct the client program to download data of interest from the target computer.

A command block allows files to be extracted by different filter criteria, including among others, file name, file type, file extension, date, time stamp, author, location, and edit date. A command block may also enable recovery of deleted files, which may be carved out from unallocated space using file signatures. Additional options include performing keyword searches using literal or regular expressions, including searching files, slack space, unallocated space, swap space and lost partitions for keyword hits. A command block allows extraction of files with responsive keywords. The command block may also be configured to recover fragments, sections of slack space, unallocated space, swap space or lost partitions that contain the keyword and its context.

The client software of the present invention accepts only commands blocks generated by an authorized control server. This may be accomplished for example by encrypting the command blocks with private keys, which are validated and recognized by the client software used in the present invention. Other methods as known in the art may also be used.

Preferably, an input-output external interface, such as a USB memory device, is used to transfer the command block from the control server to the target computer. Other external memory devices and interfaces are also contemplated as known in the art. Alternatively, a command block may be cut-and-pasted or typed into the client software running on the target computer.

Preferably, each command block works only on a specific hard drive of a specific computer. The present invention also contemplates a single command block that works on multiple drives of a single computer or multiple drives of multiple computers. In addition, a command block that work for a predetermined number of drives is also contemplated. Command blocks can be priced according to various factors such as the type and size of information involved. Factors may include, among others, size of drives analyzed, whether visible files, deleted files, FAT data, unallocated space or slack space are included, and whether recovery of lost partitions, keyword searches, web page fragment analysis, recovering Internet surfing history through parsing of history files, and de-duping recovered data are also enabled For example, exporting of visible and deleted files based on the FAT data may be priced differently from more complicated functions such as extraction of files from unallocated and slack space. Extraction of data based on keyword searches may incur an additional fee based on the number and/or complexity of the keyword(s). Command block prices may also depend on drive size.

Command blocks may also be sold for specific types of analysis at a set rate. For example, a "pornography investigation" command block would extract all images, movies and related web surfing activity involving pornographic material. The present invention also contemplates pricing structures based on pre-purchased bundles or packages or on client status, such as the client being classified as a frequent user.

Drive Key

The control server will preferably assign a unique ASCII key for a particular device or drive to ensure its logical and physical identity. Various specific data encoded in the drive key may include information such as the hardware serial number, hardware size, hardware make, version of software of the present invention, and message digest of the device or drive.

When a user purchases command blocks online, the key combined with the services selected via the site helps the control server determine user information. Version numbers can indicate where the disc was distributed and, approximately, the date they are distributed. Knowing the version number of the software of the present invention will assist the control serve in providing authenticated, working command blocks specific to the version being used.

Command Block Specification

A command block is an encrypted file that contains scripts designed to be executed by the client program to perform specific functions on a specific device or drive. These scripts generally extract data from the hard drive and save the data on the destination drive as described. The extracted data can direct data recovery from the hard drive or interpretation of data residing on the drive. The syntax of the command block is generally modeled after Structured Query Language.

Commands within command blocks will allow for direct analysis and extraction of drive data. Direct analysis of drive data is analysis that does not require outside translators and data parsers. These commands incorporate "SQL like" syntax. Commands will preferably adhere to the following basic syntax: <action> {FROM <location>} {<qualifier>}.

Data Interpretation Command Syntax

Commands within command blocks will allow for interpretation of drive data. These commands will take data files and provide an interpreted output for user review. An example of such a command includes the parsing of all Internet surfing history files to provide an output file for each history file with the appropriate columns and interpreted data.

I claim:

1. A method of conducting electronic forensic examination on a target device comprising the steps of:
   loading a client component comprising a client program residing on a physical portable memory device onto said target device;
   said client program analyzing hardware and software configurations of said target device and displaying available data storage devices for analysis;
   selecting a data storage device and requesting a limited examination of said data storage device for data of interest;
   said client program displaying limited results of said limited examination,
      wherein said limited results display limited information concerning underlying data identified by said limited examination;
      wherein underlying data identified by said limited examination is not copyable without obtaining a command block;
      wherein underlying data identified by said limited examination is not extractable without obtaining a command block;
      wherein underlying data identified by said limited examination is not exportable without obtaining a command block;
      wherein underlying data identified by said limited examination is not further interpretable without obtaining a command block; and
      wherein underlying data of interest identified by said limited examination is not further accessible beyond portions shown in said limited results display without obtaining a command block;
   determining whether further access to said data of interest is desired;
   obtaining said command block from a control server, wherein said command block comprises one or more directives that command said client program to conduct additional command-block enabled functionalities;

transferring said command block from said control server to said target device; and said client program recognizing and accepting said command block and executing said directives; and wherein said command-block enabled functionalities comprise one or more of: copying underlying data identified by said limited examination result; extracting underlying data identified by said limited examination result; exporting underlying data identified by said limited examination result; further interpreting underlying data identified by said limited examination result; further accessing underlying data identified by said limited examination result; and conducting one or more additional command-block enabled examination of said target device wherein said client program further enables a user to forensically read or view limited results of said limited examination or forensically copy data from said data storage device of said target device for external review; and wherein said command block is executable only on one or more data storage devices matching one or more drive keys contained in said command block.

2. The method according to claim 1, further comprising the steps of conducting one or more additional examinations on said data storage device of said target device without a command block.

3. The method according to claim 1, further comprising the steps of conducting one or more examinations on one or more data storage devices of said target device without a command block.

4. The method according to claim 1, further comprising the steps of conducting one or more examinations on one or more data storage devices of one or more devices without a command block.

5. The method according to claim 1, wherein said command block is specific to a drive key of said data storage device, wherein said drive key contains a message digest of said data storage device in a specific physical and logical state.

6. The method according to claim 1, wherein said command block is executable only on a data storage device matching the drive key contained in said command block.

7. The method according to claim 1, wherein said command block is executable on one or more data storage devices in one or more devices.

8. The method according to claim 1, wherein said client program examines said target device in read-only mode.

9. The method according to claim 1, wherein said client program examines data in said device in read-only mode, wherein data is stored only in random access memory to prevent creating evidence of forensic activity on said target device.

10. The method according to claim 1, further comprising the step of said client program calculating digital signatures, message digests or hash values of available data storage devices in said target device to verify that no modifications are made of said devices.

11. The method according to claim 1, further comprising the steps of said client program further documenting and logging information about said target computer and documenting and logging activity of said client program.

12. The method according to claim 1, further comprising the steps of said client program further documenting and logging information about said target computer and documenting and logging activity of said client program for authentication, and wherein said log is digitally encrypted, signed and stored.

13. The method according to claim 1, further comprising the step of further searching or organizing said displayed results.

14. The method according to claim 1, wherein said control server is an external server for providing command blocks.

15. The method according to claim 1, wherein said limited displayed examination results comprise one or more of information concerning data existence, numbers of keywords match, and one or more file attributes.

16. The method according to claim 1, wherein obtaining said command block further comprises configuring said command block to retrieve information including one or more of visible data, deleted data, FAT data, data from unallocated space, data from slack space, data from lost partitions and data from host protected areas.

17. The method according to claim 1, wherein said control server categorizes a command block according to type and volume of data requested to be examined.

18. The method according to claim 1, wherein said limited examination or said command-block enabled examination further comprises one or more of keyword searching, keyword searching with context, data filtering, binary file signature searching, keyword searching through archives such as compressed or zipped files, keyword searching through encrypted or password protected files, physical keyword searching, Internet usage history parsing, searching by relevance, de-duping data, excluding data searches based on presence of data in one or more search databases; and including searches based on presence of data in one or more search databases.

19. The method according to claim 1, wherein said limited examination or said command-block enabled examination further comprises one or more of searches or filters based on file extension, file name, date range, size range, and activity flags.

20. The method according to claim 1, said client program uses a task oriented, graphical user interface to guide said user through various steps in conducting a forensic examination.

21. The method according to claim 1, further comprising the steps of making an encrypted copy of entire data storage device or making an encrypted copy of data identified by said examination or command-block enabled examination.

22. A method of conducting electronic forensic examination for determining whether data of interest resides within a target computer using forensically sound protocols comprising the steps of:

automatically booting said target computer and analyzing hardware and software configurations of said target computer using a client component comprising a client program residing on a physical portable memory device;

searching or filtering data in a data storage device of said target computer for data of interest;

displaying limited search results or filter results, wherein underlying data identified by said limited search or filter result is not further accessible beyond portions shown in said limited displayed search results, wherein underlying data identified by said displayed limited search or filter results is not copyable without obtaining a command block, wherein underlying data identified by said displayed limited search or filter results is not extractable without obtaining a command block, wherein underlying data identified by said displayed limited search or filter results is not exportable without obtaining a command block, wherein underlying data identified by said displayed limited search or filter results is not further interpretable without obtaining a command block;

using forensically sound protocols comprising one or more of steps of examining the target computer in read-only mode, conducting a content check of available data storage devices of said target computer, calculating a message digest, documenting and logging information about said target computer, and documenting and logging activity of said client program for authentication;

directing said client component using a command block to conduct additional functionalities, wherein said additional functionalities comprise one or more steps of: copying underlying data identified by said search results and said filter results to an external storage device, extracting underlying data identified by said limited search results and said filter results to an external storage device, exporting underlying data identified by said limited search results and said filter results to an external storage device, further interpreting underlying data identified by said limited search results and said filter results to an external storage device, further accessing underlying data identified by said limited search results, conducting additional command-block enabled functions, and copying underlying data identified by said additional command-block functions to an external storage device; and obtaining said command block from a control server wherein said client program further enables a user to forensically read or view limited displayed search results or forensically copy data from said data storage device of said target device for external review; and wherein said command block is executable only on one or more data storage devices matching one or more drive keys contained in said command block.

23. A method of conducting electronic forensic examination comprising the steps of:

loading a client component comprising a client program residing on a physical portable memory device onto said target computer;

using the client program, further comprising the steps of:
  automatically booting a target computer in read-only mode;
  automatically logging hardware and software configurations;
  automatically logging examination activities of said client component;
  automatically calculating a message digest for a selected data storage device;
  conducting one or more searches or filters to determine whether data of interest resides on said selected data storage device;
  displaying limited information concerning data identified by said searches or filters;
    wherein data identified by said searches or filters is not copyable without obtaining a command block;
    wherein data identified by said searches or filters is not extractable without obtaining a command block;
    wherein data identified by said searches or filters is not exportable without obtaining a command block; and
    wherein data identified by said searches or filters is not further interpretable without obtaining a command block using said command block, further comprising one or more steps of:
  directing the client component to copy, extract, export, or further interpret the data identified by said searches or filters onto a separate storage device;
  conducting additional searches, filters or functions not available with the client component alone and copying data identified by said additional searches, filters or functions onto an external storage device;

wherein said command block is executable on a specific data storage device identified by the specific data storage device's message digest wherein said client program further enables a user to forensically read or view limited information concerning data identified by said searches or filters or forensically copy data from said data storage device of said target device for external review; and wherein said command block is executable only on one or more data storage devices matching one or more drive keys contained in said command block.

24. A method of conducting electronic forensic examination on a target computer comprising the steps of:

loading a client component comprising a client program residing on a physical portable memory device onto said target computer;

said client program analyzing hardware and software configurations of said target computer and displaying available data storage devices for analysis;

selecting a data storage device and requesting search or filter of said data storage device for data of interest;

said client program displaying results of said search or filter, wherein search or filter results show limited information about said data of interest, and wherein underlying data of interest identified by said limited displayed search or filter results is not further accessible beyond portions shown in said limited displayed search or filter result;
  wherein said underlying data identified is not copyable without obtaining a command block;
  wherein said underlying data identified is not extractable without obtaining a command block;
  wherein said underlying data identified is not exportable without obtaining a command block; and
  wherein said underlying data identified is not further interpretable without obtaining a command block determining whether further access to said data of interest is desired;

obtaining a command block from a control server, wherein said command block comprises directives that command said client program to conduct additional command-block enabled functionalities, and wherein said command-block enabled functionalities comprise one or more of copying, exporting, extracting, or further accessing underlying data of interest identified by said search or filter results to an external storage device, conducting one or more additional command-block enabled search or filter of said data storage device; and copying underlying data of interest identified by said one or more additional command-block enabled search or filter results to an external storage device;

transferring said command block from said control server to said target computer;

said client program recognizing and accepting said command block and executing said directives wherein said client program further enables a user to forensically read or view limited displayed search or filter result or forensically copy data from said data storage device of said target device for external review; and wherein said command block is executable only on one or more data storage devices matching one or more drive keys contained in said command block.

* * * * *